United States Patent
Nagano et al.

(10) Patent No.: US 10,479,178 B2
(45) Date of Patent: Nov. 19, 2019

(54) FUEL CELL SYSTEM

(71) Applicant: TOYOTA JIDOSHA KABUSHIKI KAISHA, Toyota-shi, Aichi-ken (JP)

(72) Inventors: Shuji Nagano, Toyota (JP); Yuichi Yagami, Kuwana (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 452 days.

(21) Appl. No.: 14/939,933

(22) Filed: Nov. 12, 2015

(65) Prior Publication Data
US 2016/0141641 A1    May 19, 2016

(30) Foreign Application Priority Data
Nov. 14, 2014  (JP) ................... 2014-232030

(51) Int. Cl.
*B60K 1/00*  (2006.01)
*B60K 1/04*  (2019.01)

(52) U.S. Cl.
CPC ........ *B60K 1/04* (2013.01); *B60K 2001/0438* (2013.01); *H01M 2250/20* (2013.01)

(58) Field of Classification Search
CPC ............ B60K 1/04; B60K 2001/0438; H01M 8/04089; H01M 2250/20; B60L 11/1883; Y02T 90/32; B60R 16/0207
See application file for complete search history.

(56) References Cited

U.S. PATENT DOCUMENTS

| | | | |
|---|---|---|---|
| 7,427,447 B2 | 9/2008 | Nishiumi | |
| 2003/0137193 A1 | 7/2003 | Beischner et al. | |
| 2006/0102398 A1 | 5/2006 | Mizuno | |
| 2012/0015257 A1* | 1/2012 | Arisawa | B60K 1/04 |
| | | | 429/400 |
| 2012/0028135 A1 | 2/2012 | Ohashi | |
| 2013/0175854 A1* | 7/2013 | Chamberlin | B60L 3/0069 |
| | | | 307/9.1 |
| 2014/0030563 A1 | 1/2014 | Hoshi et al. | |
| 2014/0367182 A1 | 12/2014 | Yoshinaga et al. | |

FOREIGN PATENT DOCUMENTS

| | | |
|---|---|---|
| DE | 10 2010 022 024 A1 | 12/2011 |
| DE | 11 2009 004 862 T5 | 11/2012 |
| DE | 11 2013 000 719 T5 | 11/2014 |
| JP | 2002-362164 | 12/2002 |
| JP | 2003-523067 A | 7/2003 |

(Continued)

*Primary Examiner* — Nicholas P D'Aniello
(74) *Attorney, Agent, or Firm* — Finnegan, Henderson, Farabow, Garrett & Dunner, LLP

(57) ABSTRACT

A fuel cell system includes: a fuel cell that causes electrochemical reaction of an anode gas and a cathode gas; a plurality of auxiliary machines that are used for operation of the fuel cell; and a fuel cell system case that is configured to place the fuel cell and the plurality of auxiliary machines therein, wherein, in the fuel cell system case, a surface from which a first cable harness including first electric wire used for supplying electric power to the plurality of auxiliary machines is taken out differs from a surface from which a second cable harness including second electric wire for supplying larger electric power than the electric power of the first electric wire is taken out.

8 Claims, 1 Drawing Sheet

(56) References Cited

FOREIGN PATENT DOCUMENTS

| | | |
|---|---|---|
| JP | 2004-127747 | 4/2004 |
| JP | 2005-125956 A | 5/2005 |
| JP | 2006-131146 | 5/2006 |
| JP | 2008-316676 A | 11/2006 |
| WO | WO 2006/059469 | 6/2006 |
| WO | WO2010/137147 A1 | 12/2010 |
| WO | WO 2012/140791 | 10/2012 |

\* cited by examiner

FUEL CELL SYSTEM

CROSS-REFERENCE TO RELATED APPLICATION

This application claims priority to Japanese Patent Application No. 2014-232030, filed on Nov. 14, 2014, the contents of all of which are incorporated herein by reference in their entirety.

BACKGROUND

Field

The present invention relates to a fuel cell system.

Related Art

Conventionally, a fuel cell to be mounted on a vehicle is accommodated in a fuel cell system case. A cable harness for supplying electric power from a secondary battery etc. to a pump for supplying anode gas to a fuel cell, and a cable harness for supplying electric power from the secondary battery etc. to auxiliary machines, such as sensors, connected to the fuel cell, are attached to the fuel cell. JP2002-362164A etc. disclose a fuel cell which is disposed on a front side of a vehicle, where cable harnesses are drawn from a fuel cell system case to a rear side of the vehicle in order to protect them from a front collision of the vehicle.

However, if the cable harnesses are collectively drawn from one place, a drawing opening through which the cable harnesses are drawn from the fuel cell system case increases in size. As the result, in order to secure waterproofness of the drawing opening, the fuel cell system case where the fuel cell and the auxiliary machines are accommodated increases in size.

SUMMARY

The present invention is made in order to address at least a part of the subject described above, and can be implemented in terms of the following aspects.

(1) According to one aspect of the invention, a fuel cell system to be mounted on a vehicle is provided, which includes a fuel cell that causes electrochemical reaction of an anode gas and a cathode gas; a plurality of auxiliary machines that are used for operation of the fuel cell; and a fuel cell system case that is configured to place the fuel cell and the plurality of auxiliary machines therein, wherein, in the fuel cell system case, a surface from which a first cable harness including first electric wire used for supplying electric power to the plurality of auxiliary machines is taken out differs from a surface from which a second cable harness including second electric wire for supplying larger electric power than the electric power of the first electric wire is taken out. According to this aspect, since the first cable harness and the second cable harness are drawn from the different surfaces, drawing holes through which the cable harnesses are respectively drawn from the fuel cell system case become small. As a result, the fuel cell system case can be reduced in size.

(2) In the fuel cell system of the aspect described above, the second cable harness may be taken out from a surface of the fuel cell system case that is a surface selected from the group consisting of a surface that is opposed to a front side of the vehicle, a surface that is opposed to a rear side of the vehicle, a surface that is opposed to an upper side of the vehicle, and a surface that is opposed to a lower side of the vehicle. According to this aspect, a possible disconnection or short-circuit of the electric wire included in the second cable harness due to a side collision can be reduced. In other words, the second electric wire for supplying the larger electric power than the first electric wire can be preferentially protected from the first electric wire against the side collision.

(3) In the fuel cell system of the aspect described above, the fuel cell system case may include a fuel cell case that is configured to place the fuel cell therein, and an auxiliary machinery case accommodating the plurality of auxiliary machines. According to this aspect, since the plurality of auxiliary machines are accommodated in the auxiliary machinery case, contact of foreign matters with the auxiliary machines can be reduced.

(4) In the fuel cell system of the aspect described above, at least a part of the auxiliary machinery case may be covered with a resin cover. According to this aspect, noise and vibration which are caused inside the auxiliary machinery cover can be reduced.

(5) In the fuel cell system of the aspect described above, the second electric wire may be an electric wire for supplying electric power to a pump for supplying the anode gas to the fuel cell.

(6) In the fuel cell system of the aspect described above, the first cable harness may be drawn from a surface of the fuel cell system case, that is a surface that faces rightward of the vehicle, or a surface that faces leftward of the vehicle, and the first cable harness may be disposed in a recessed portion formed in the fuel cell system case. According to this aspect, a possible disconnection or short-circuit of the first cable harness due to the side collision can be reduced, compared with a case where the first cable harness is not disposed in the recessed portion.

(7) In the fuel cell system of the aspect described above, the first cable harness may be disposed outward in width directions of the vehicle from an outlet through which the second cable harness is taken out from the fuel cell system case. According to this aspect, the second cable harness can be protected by the first cable harness.

(8) In the fuel cell system of the aspect described above, the first cable harness may include third electric wire for transmitting an electrical signal acquired from the plurality of auxiliary machines. According to this aspect, since the third electric wire for transmitting the electrical signal which is acquired from the plurality of auxiliary machines are not included in the second cable harness, noise to the electrical signal due to electromagnetic waves generated by the second electric wire can be reduced.

The present invention can be implemented in various forms, such as a method of manufacturing the fuel cell system, a computer program for implementing the manufacturing method, and a recording medium that records the computer program.

DESCRIPTION OF EMBODIMENTS

A. Embodiment

Figure 1:
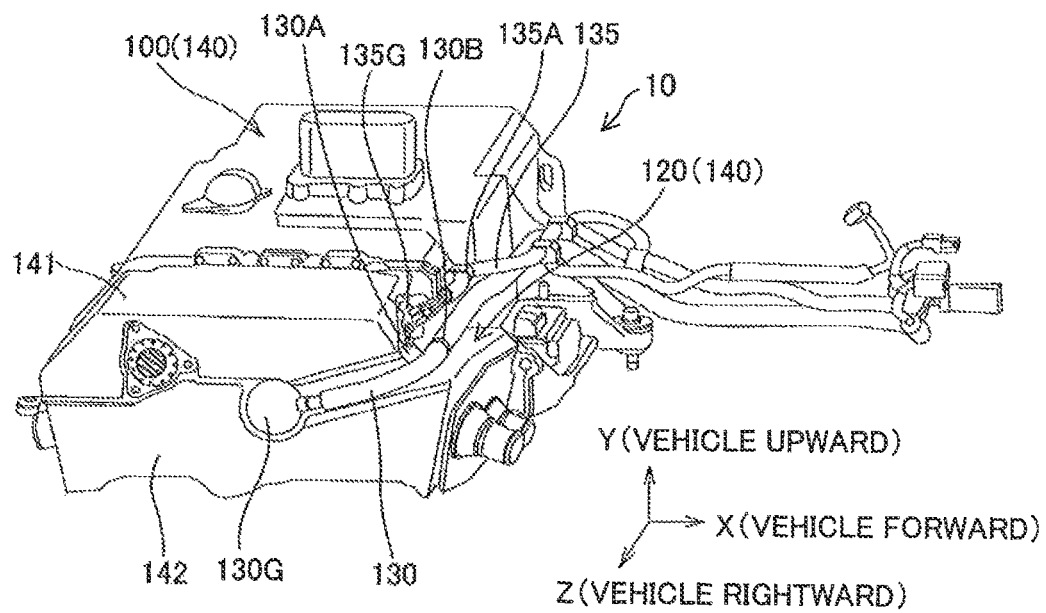
FIG. 1 is a schematic view illustrating a fuel cell system used for one embodiment of the invention.

FIG. 1 is a schematic view illustrating a fuel cell system 10 used for one embodiment of the invention. The fuel cell system 10 includes a first cable harness 130, a second cable harness 135, and a fuel cell system case 140. The fuel cell system 10 is mounted on a vehicle. In this embodiment, the fuel cell system 10 is provided below a vehicle cabin. In FIG. 1, a positive X-direction indicates front or forward of the vehicle, a positive Y-direction indicates up or upward of the vehicle, and a positive Z-direction indicates right or rightward of the vehicle.

The first cable harness 130 includes first electric wires used for supplying electric power to a plurality of auxiliary machines (not illustrated) which will be described later. The second cable harness 135 includes second electric wires far supplying electric power larger than the first electric wires. In this embodiment, the second electric wires are electric wires for supplying power to a hydrogen pump (not illustrated), and is a line for supplying three-phase alternating current (AC) power.

The first cable harness 130 further includes third electric wires for transmitting an electrical signal which is acquired from the plurality of auxiliary machines. Since the third electric wires are not included in the second cable harness 135, noise to the electrical signal due to electromagnetic waves generated by the second electric wires can be reduced.

The fuel cell system case 140 includes a fuel cell case 100 and an auxiliary machinery case 120. The fuel cell system case 140 is provided with surfaces which respectively face forward, rearward, upward, downward, rightward and leftward of the vehicle. The fuel cell case 100 accommodates a fuel cell which causes electrochemical reactions of hydrogen gas as anode gas and oxygen gas as cathode gas. The fuel cell is comprised of unit cells which are stacked, and is mounted so that stacking directions are oriented in the vehicle width directions.

The auxiliary machinery case 120 accommodates the plurality of auxiliary machines used for operation of the fuel cell, and a pump (also referred to as "the hydrogen pump") for supplying hydrogen as anode gas to the fuel cell. Here, the plurality of auxiliary machines include injectors, discharge and drain valves, valves, and sensors, for example.

The perimeter of the auxiliary machinery case 120 is partially covered with covers 141 and 142 made of natural or synthetic resin. The resin covers 141 and 142 have an inner layer which is made of urethane and an outer layer which is made of hard resin. The auxiliary machines are accommodated in the auxiliary machinery case 120. Thus, an entry of foreign matters, such as water, stones, and mud, into the auxiliary machinery case 120, can be reduced. Further, the resin covers 141 and 142 can reduce vibration and noise which are caused by the plurality of auxiliary machines and the hydrogen pump.

Figure 2:
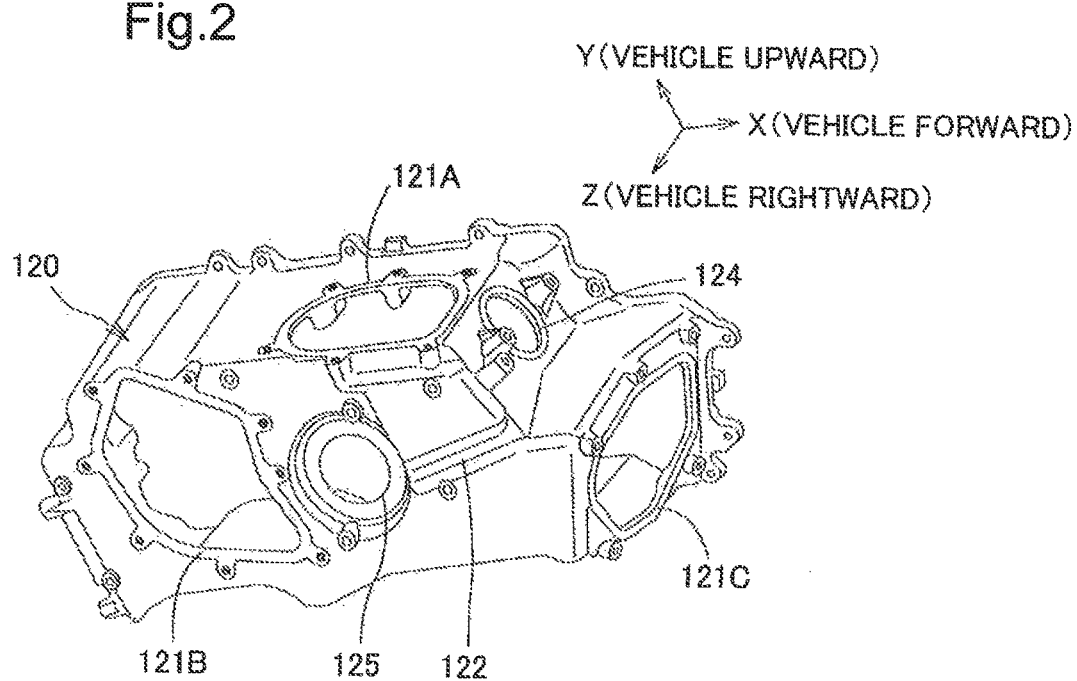
FIG. 2 is a schematic view illustrating an auxiliary machinery case.

FIG. 2 is a schematic view illustrating the auxiliary machinery case 120. The auxiliary machinery case 120 is integrally formed by aluminum die-casting. Thus, the strength of the auxiliary machinery case 120 can be secured. X-Y-Z coordinate system of FIG. 2 corresponds to X-Y-Z coordinate system of FIG. 1.

A first outlet 125 is a hole through which the first cable harness 130 is taken out from the auxiliary machinery case 120. A second outlet 124 is a hole through which the second cable harness 135 is taken out from the auxiliary machinery case 120. Openings 121A and 121B are service openings used for a work of connecting the cable harnesses to the auxiliary machines. An opening 121C is an opening through which a piping of gas and a piping of cooling water used for the fuel cell pass.

As illustrated in FIG. 2, the surface from which the first cable harness 130 is taken out differs from a surface from which the second cable harness 135 is taken out. That is, the fuel cell system case 140 includes a first surface formed with the first outlet 125 through which the first cable harness 130 is taken out, and a second surface formed with the second outlet 124 through which the second cable harness 135 is taken out, and the first surface differs from the second surface. Thus, the outlets through which the cable harnesses are respectively drawn from the fuel cell system case 140 become smaller, as compared with a case where all the cable harnesses are collectively drawn from the same surface or hole. As the result, the fuel cell system case 140 can be reduced in size.

The second cable harness 135 is taken out from a surface of the fuel cell system case 140, which faces forward of the vehicle. Thus, a possible disconnection or short-circuit of the second cable harness 135 due to a side collision can be reduced. In other words, the second electric wires for supplying the larger power than the first electric wires can be preferentially protected from the first electric wires against the side collision. Note that the vehicle has a dimension in longitudinal directions which is longer than a dimension in width directions. Thus, a measure against the side collision is more important than a measure against a front collision or a rear collision. Note that similar effects can still be acquired if the second cable harness 135 is taken out from a surface of the fuel cell system case 140, which faces rearward of the vehicle.

The first cable harness 130 is taken out from a surface of the fuel cell system case 140, which faces rightward of the vehicle. Further, the first cable harness 130 is disposed in a recessed portion 122 formed in the fuel cell system case 140. As constructed in this way, the possible disconnection and short-circuit of the first cable harness 130 due to the side collision can be reduced, compared with a case where the first cable harness 130 is not disposed in the recessed portion 122. Note that the sentence "the first cable harness 130 is disposed in the recessed portion 122" as used herein refers to that at least a part of the first cable harness 130 is disposed in the recessed portion 122. Note that, similar effects can still be acquired if the first cable harness 130 is taken out from a surface of the fuel cell system case 140, which faces leftward of the vehicle.

The first cable harness 130 is disposed outward in the width directions of the vehicle from the second outlet 124 through which the second cable harness 135 is taken out from the fuel cell system case 140. Thus, the outlet of the second cable harness 135 can be protected by the first cable harness 130.

As illustrated in FIG. 1, a grommet 130G is provided to the outlet of the first cable harness 130 and, thus, an entry of foreign matters into the auxiliary machinery case 120 can be reduced by the grommet 130G. Similarly, a grommet 135G is provided to the outlet of the second cable harness 135 and, thus, an entry of foreign matters into the auxiliary machinery case 120 can be reduced by the grommet 135G. Note that if the electric wires included in the first cable harness 130 and the electric wires included in the second cable harness 135 are included in a single cable harness, and this cable harness is taken out from a single outlet, the following demerits are caused. That is, since a grommet provided to the outlet increases in size, it is necessary to have a larger surface for forming the outlet, thereby increasing the fuel cell system case 140 in size. The larger grommet provided to the outlet requires higher dimensional precision in order to reduce the entry of foreign matters. However, such demerits can be addressed by this embodiment.

In this embodiment, a bracket 130A and a clamp 130B are provided to the first cable harness 130, and the first cable harness 130 is fixed by the bracket and clamp. Similarly, a clamp 135A is provided to the second cable harness 135, and the second cable harness 135 is fixed by the clamp.

Other effects of the described above structure includes easily secured gaps between the fuel cell system case 140 and adjacent components, and an increased degree of freedom of a mounting space due to the reduction of the fuel cell system case 140 in size. On the other hand, if the cable harnesses are integrally formed rather than providing the plurality of cable harnesses, the cable harness itself becomes thicker and becomes difficult to be bent. Thus, a larger space is required for laying the cable harness, thereby increasing the fuel cell system in size. However, such demerits can be addressed by this embodiment.

B. Modifications

B1. Modification 1

In this embodiment, the resin covers 141 and 142 are not disposed on an external surface of the auxiliary machinery case 120, where the first cable harness 130 is disposed. As constructed in this way, an outward projection of the first cable harness 130 can be prevented. However, the present invention is not limited to this structure. For example, the resin covers 141 and 142 may also be disposed on the external surface of the auxiliary machinery case 120, where the first cable harness 130 is disposed.

B2. Modification 2

In this embodiment, in the fuel cell system case 140, the surface from which the first cable harness 130 is taken out is a surface which faces rightward of the vehicle, and the surface from which the second cable harness 135 is taken out is a surface which faces forward of the vehicle. However, the present invention is not limited to this structure. The fuel cell system case 140 has a structure in which the surface from which the first cable harness 130 is taken out is different from the surface from which the second cable harness 135 is taken out. That is, the possible disconnection or short-circuit of the electric wires included in the second cable harness due to the side collision can be reduced by using any one of the surface which faces rearward of the vehicle, the surface which faces upward of the vehicle, the surface which face downward of the vehicle as the surface from which the second cable harness 135 is taken out. An increase of the fuel cell system in height can also be reduced by using the surface which faces forward of the vehicle or the surface which faces rearward as the surface from which the second cable harness 135 is taken out.

The present invention is not limited to the embodiment and the modifications described above, and can be implemented in various structures without departing from the scope of the invention. For example, technical features in the embodiment and the modifications corresponding to technical features of each aspect cited in the section of "SUMMARY," can suitably be substituted and/or combined in order to address some or all of the subjects described above, or in order to obtain some or all of the effects described above. The technical features can suitably be deleted if they are not described as essential matters in this specification.

What is claimed is:

1. A fuel cell system to be mounted on a vehicle, comprising:
    a fuel cell that causes electrochemical reaction of an anode gas and a cathode gas;
    a plurality of auxiliary machines that are used for operation of the fuel cell; and
    a fuel cell system case that is configured to accommodate the fuel cell and the plurality of auxiliary machines therein, wherein the fuel cell system case accommodating the fuel cell and the plurality of auxiliary machines includes:
        a first surface from which a first cable harness extends, the first cable harness including first electric wire used for supplying electric power to the plurality of auxiliary machines, and
        a second surface from which a second cable harness extends, the second cable harness including second electric wire for supplying larger electric power than the electric power of the first electric wire to an equipment other than the fuel cell, the equipment being accommodated with the fuel cell in the fuel cell system case,
    wherein the first surface of the fuel cell system case faces in a first direction different from a second direction that the second surface of the fuel cell system case faces, and
    wherein the second surface of the fuel cell system case is either a surface that is opposed to a front side of the vehicle or a surface that is opposed to a rear side of the vehicle.

2. The fuel cell system in accordance with claim 1, wherein the fuel cell system case includes
    a fuel cell case that is configured to accommodate the fuel cell therein, and
    an auxiliary machinery case accommodating the plurality of auxiliary machines.

3. The fuel cell system in accordance with claim 2, wherein at least a part of the auxiliary machinery case is covered with a resin cover.

4. The fuel cell system in accordance with claim 1, wherein the equipment is a pump for supplying the anode gas to the fuel cell.

5. The fuel cell system in accordance with claim 1,
    wherein the first surface of the fuel cell system case is a surface that faces rightward of the vehicle or a surface that faces leftward of the vehicle, and
    wherein the first cable harness is disposed in a recessed portion formed in the fuel cell system case.

6. The fuel cell system in accordance with claim 1, wherein the first cable harness is disposed outward in width directions of the vehicle from an outlet of the second surface of the fuel cell system case through which the second cable harness extends.

7. The fuel cell system in accordance with claim 1, wherein the first cable harness includes third electric wire for transmitting an electrical signal acquired from the plurality of auxiliary machines.

8. The fuel cell system in accordance with claim 1,
    wherein the first surface of the fuel cell system case includes a first outlet through which the first cable harness extends; and
    wherein the second surface of the fuel cell system case includes a second outlet through which the second cable harness extends.

* * * * *